United States Patent
Sharawi et al.

(10) Patent No.: US 10,892,562 B1
(45) Date of Patent: Jan. 12, 2021

(54) MULTI-BEAM YAGI-BASED MIMO ANTENNA SYSTEM

(71) Applicant: King Fahd University of Petroleum and Minerals, Dhahran (SA)

(72) Inventors: Mohammad S. Sharawi, Dhahran (SA); Syed Shahan Jehangir, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/510,216

(22) Filed: Jul. 12, 2019

(51) Int. Cl.
*H01Q 7/00* (2006.01)
*H01Q 19/30* (2006.01)
(Continued)

(52) U.S. Cl.
CPC ............. *H01Q 21/24* (2013.01); *H01Q 7/00* (2013.01); *H01Q 9/0407* (2013.01);
(Continued)

(58) Field of Classification Search
CPC .......... H01Q 19/30; H01Q 21/24; H01Q 7/00; H01Q 13/0258; H01Q 13/106;
(Continued)

(56) References Cited

U.S. PATENT DOCUMENTS 2,955,286 A * 10/1960 Klein .................... H01Q 21/20
    343/742
4,208,660 A * 6/1980 McOwen, Jr. ........ H01Q 9/0435
    343/769

(Continued)

FOREIGN PATENT DOCUMENTS

CN    103811861 A    5/2014
CN    104103900 A    10/2014
(Continued)

OTHER PUBLICATIONS

Alieldin, et al. ; A Reconfigurable Broadband Dual-Mode Dual-Polarized Antenna for Sectorial/Omnidirectional Mobile Base Stations ; Progress in Electromagnetics Research, vol. 163 ; pp. 1-13 ; 2018 ; 13 Pages.

*Primary Examiner* — Vibol Tan
(74) *Attorney, Agent, or Firm* — Oblon, McClelland, Maier & Neustadt, L.L.P.

(57) ABSTRACT

An orthogonally polarized Yagi-like MIMO antenna system and a triangular printed wideband Yagi based MIMO antenna system, respectively, and methods for making the antennas. The orthogonally polarized Yagi-like MIMO antenna system includes two slot round loop elements on a top side of a substrate. Each slot round loop element has two input ports and two slot reflectors. For each slot round loop element, one of the two input ports is placed orthogonally to the other input port, and one of the two slot reflectors is placed orthogonally to the other slot reflector. The triangular printed wideband Yagi based MIMO antenna system includes three round loop elements on a top side of a substrate and a circular reflector on a bottom side of the substrate. Each of the three round loop elements is placed at 120° with respect to other two round loop elements and has three parasitic directors.

12 Claims, 12 Drawing Sheets

(51) Int. Cl.
*H01Q 21/24* (2006.01)
*H04B 7/10* (2017.01)
*H04B 7/0413* (2017.01)
*H01Q 13/02* (2006.01)
*H01Q 9/04* (2006.01)
*H01Q 13/10* (2006.01)
*H01Q 19/20* (2006.01)

(52) U.S. Cl.
CPC ....... *H01Q 13/0258* (2013.01); *H01Q 13/106* (2013.01); *H04B 7/0413* (2013.01); *H04B 7/10* (2013.01); *H01Q 19/20* (2013.01)

(58) Field of Classification Search
CPC .... H01Q 9/0407; H01Q 19/20; H01Q 9/0428; H01Q 9/0492; H01Q 13/0241; H01Q 15/242; H01Q 19/136; H01Q 25/001; H01Q 11/02; H04B 7/10; H04B 7/0413
See application file for complete search history.

(56) References Cited

U.S. PATENT DOCUMENTS

| | | | |
|---|---|---|---|
| 5,714,961 A * | 2/1998 | Kot | H01Q 13/106 343/700 MS |
| 6,650,299 B2 * | 11/2003 | Zhang | H01Q 13/10 343/770 |
| 7,659,860 B2 * | 2/2010 | Manholm | H01Q 13/106 343/769 |
| 8,350,771 B1 * | 1/2013 | Zaghloul | H01Q 5/40 343/769 |
| 10,256,549 B2 * | 4/2019 | Sharawi | H01Q 1/48 |
| 10,547,107 B2 * | 1/2020 | Hussain | H01Q 21/28 |

FOREIGN PATENT DOCUMENTS

| | | |
|---|---|---|
| CN | 108448244 A | 8/2018 |
| JP | 2003-110354 | 4/2003 |
| JP | 2006-340246 | 12/2006 |

* cited by examiner

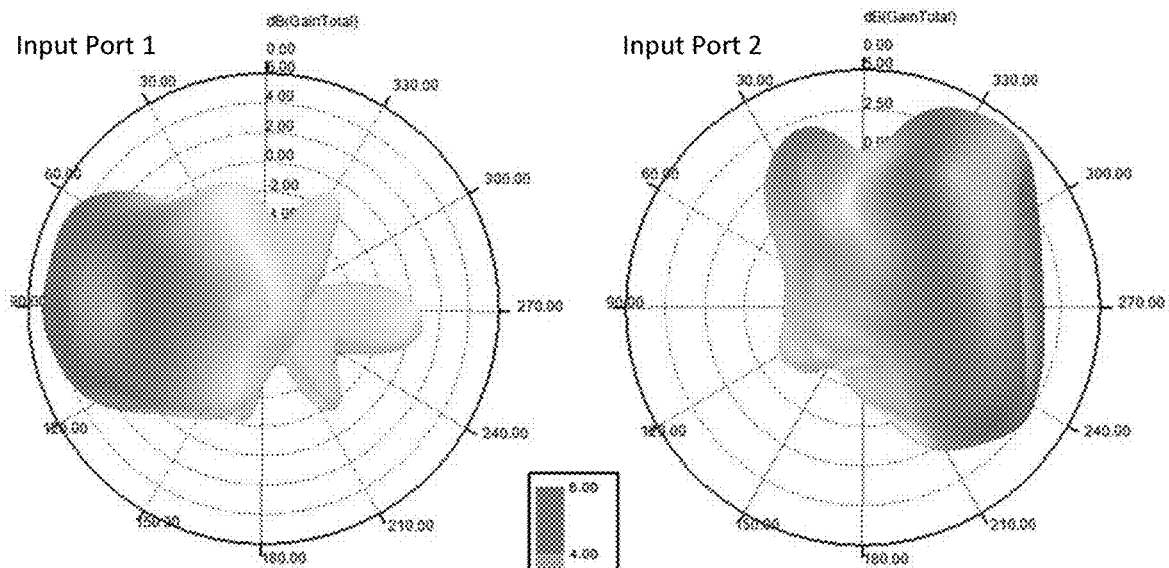
FIG. 5A
FIG. 5B
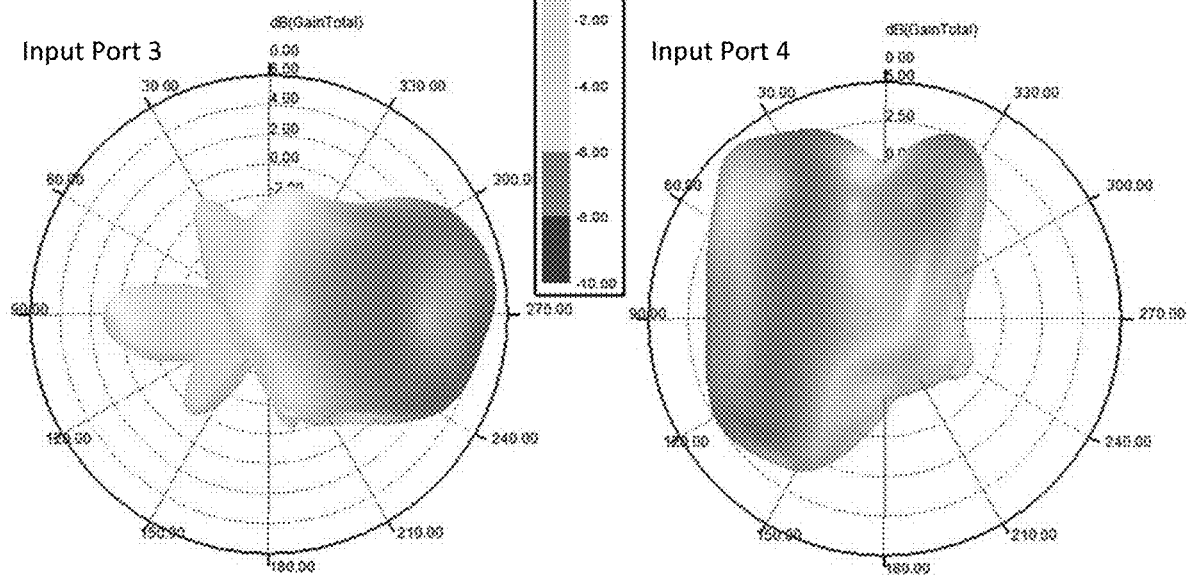
FIG. 5C
FIG. 5D

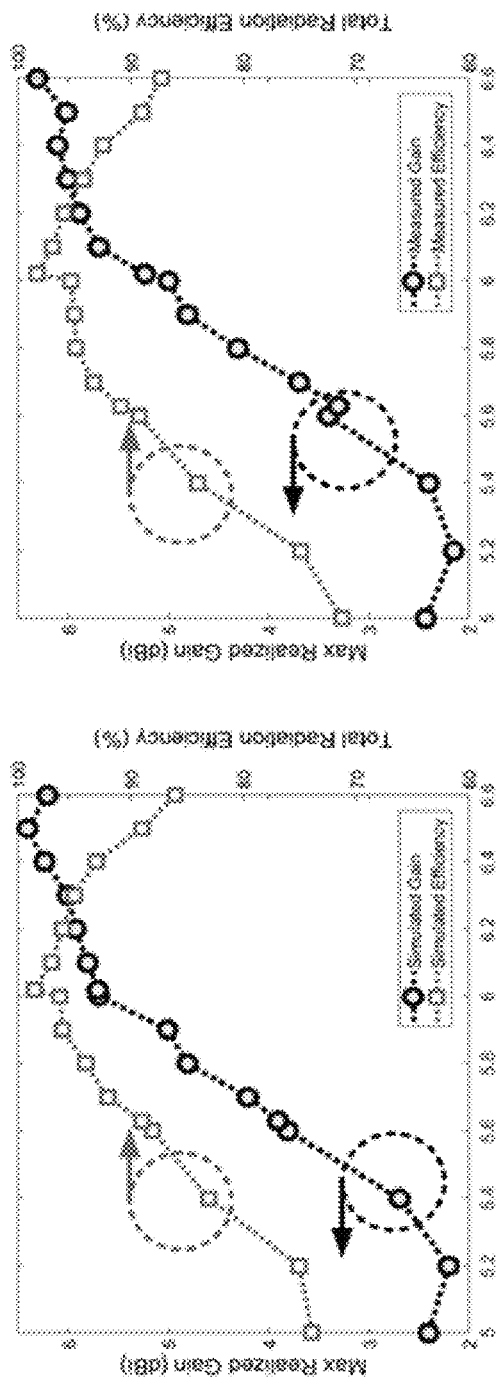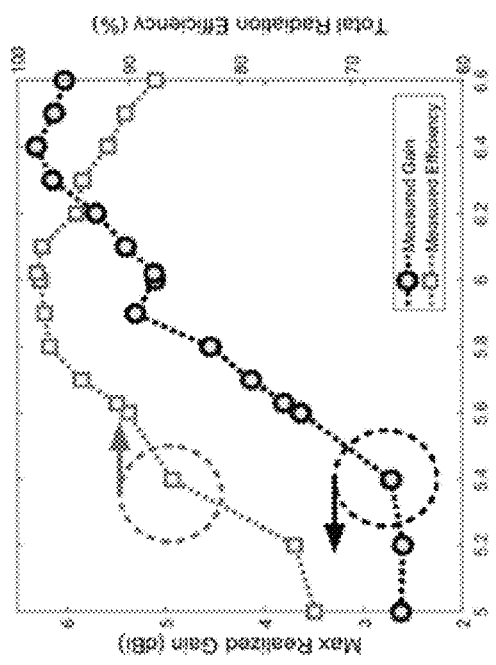
FIG. 10A
FIG. 10B
FIG. 10C

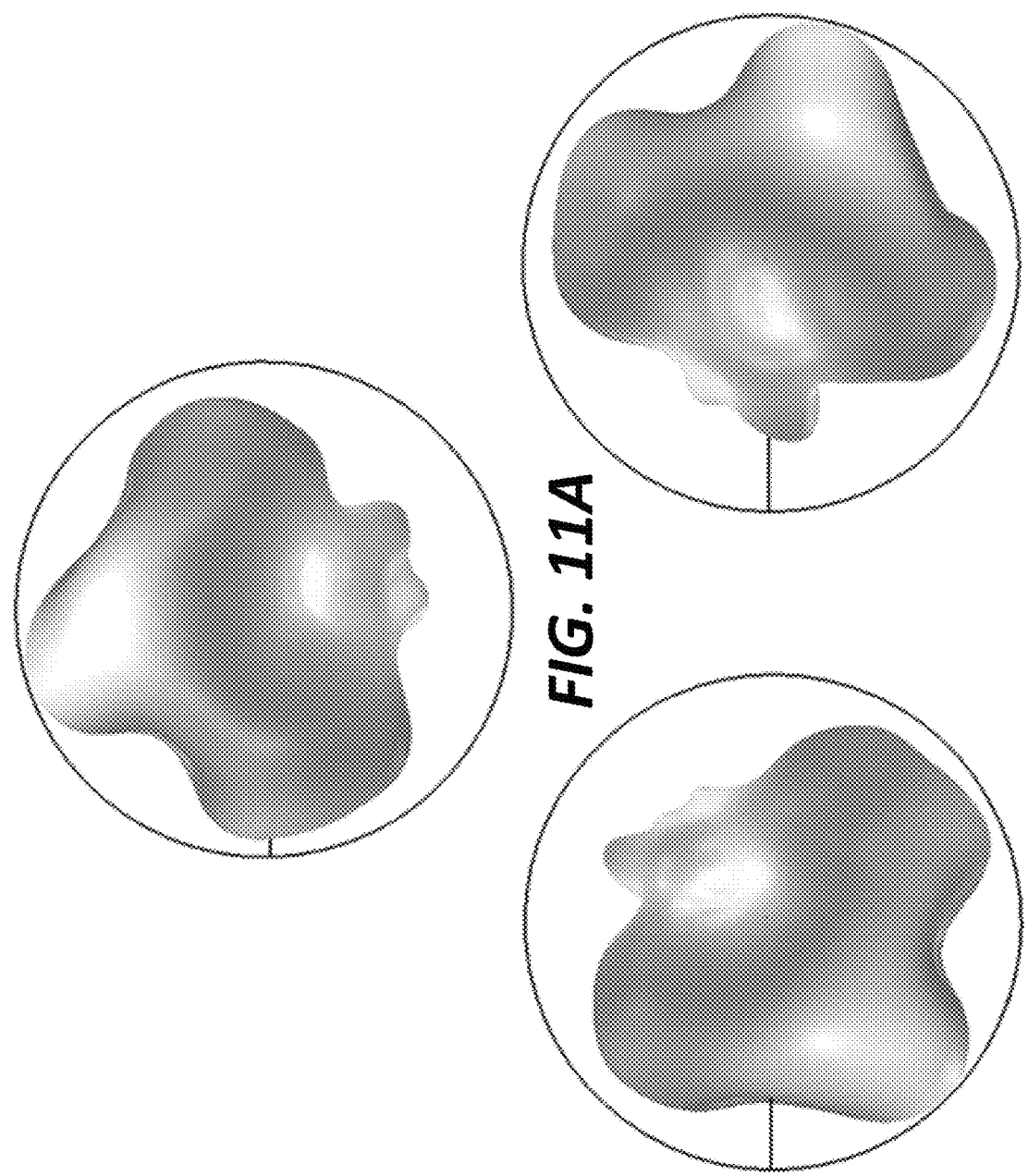
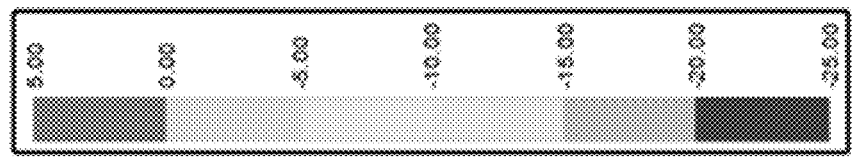
FIG. 11A
FIG. 11B
FIG. 11C

MULTI-BEAM YAGI-BASED MIMO ANTENNA SYSTEM

BACKGROUND

Technical Field

The present disclosure is directed to antenna systems, and more particularly, to a wideband compact single layer orthogonally polarized Yagi-like MIMO antenna system and a wideband multi-beam sectoral Yagi MIMO antenna system.

Description of Related Arts

The "background" description provided herein is for the purpose of generally presenting the context of the disclosure. Work of the presently named inventors, to the extent it is described in this background section, as well as aspects of the description which may not otherwise qualify as prior arts at the time of filing, are neither expressly or impliedly admitted as prior arts against the present disclosure.

The upcoming wireless communication standards demand for higher data rates and more stable signal quality for various applications such as browsing, navigation, video streaming, monitoring, and online gaming. Multiple-input-multiple-output (MIMO) technology is one of promising techniques for increasing channel capacity or a data rate within limitations of power levels and frequency bandwidth, therefore, it has drawn the attention of many design engineers and researchers.

Channel capacity or data rate can also be increased by employing diversity techniques such as spatial, polarization, and pattern diversity. Polarization diversity is considered useful as it can provide high isolated channels without increasing the size of the antenna system. Therefore, it is considered promising for compact wireless devices. The use of an orthogonally polarized MIMO antenna inside a compact wireless device can reduce the number of antennas, for example, a single dual-polarized element can be used instead of two separate elements, and hence such antenna systems can reduce the overall size of the antenna system without compromising other performance metrics.

Compact MIMO antenna systems are of high demand in the current 4G as well as in the forthcoming 5G wireless communication devices because these antenna systems are compatible with various small form factor handheld wireless devices and hence can be used for a wide range of applications. By increasing the number of independent channels and the number of antennas at the transmitter and the receiver sides, these MIMO antenna systems can provide a higher data rate, a higher channel capacity, a better coverage, and an improved transmission quality within a multipath fading environment. In addition, compact wideband MIMO antenna systems can cover multiple bands without requiring extra hardware or complex frequency re-configurability techniques.

Yagi-Uda antennas are widely known for their end-fire directional radiation patterns, high gain, high directivity, high FBR, and ease of fabrication. A classic Yagi-Uda antenna with a dipole excitation has a narrow bandwidth. Yagi based directional MIMO antennas can provide better diversity performance in terms of very low channel correlation between the radiated fields. Such directional antenna systems are of high interest in the future 5G technologies. However, due to the limited availability of space inside compact wireless devices, the MIMO antenna systems require extensive care in the design in terms of current coupling between the adjacent ports as well as the correlation between the radiated fields of the multiple elements inside a MIMO antenna system.

Accordingly, it is one object of the present disclosure to provide MIMO antennas systems including a wideband compact single layer orthogonally polarized Yagi-like MIMO antenna system and a wideband multi-beam sectoral Yagi MIMO antenna system, and methods for making the MIMO systems.

SUMMARY

The present disclosure presents a wideband compact Yagi-like directional MIMO antenna system. A simple dual orthogonal feeding technique is used to generate orthogonally polarized beams from a single loop element using microstrip lines. This technique is quite simple as compared to other complex techniques used in related technologies to generate cross-polarized beams. The proposed design is based on a single layer geometry as compared to the 3D structures used in the related technologies. The common omnidirectional orthogonal beams obtained from a typical slot antenna are made directional by using compact multiple reflector elements, as compared to complex back-lobe reduction techniques used in the related technologies. A very simple bandwidth enhancement technique is used as compared to the complex bandwidth enhancement techniques use in the related technologies. The proposed design introduces a wideband single layer orthogonally polarized MIMO antenna system in a Yagi configuration with directional beams and a compact size. The design is suitable for compact handheld and other wireless devices. Due to the feature of orthogonality, the directional beams are isolated in the far field and give very low envelope correlation coefficient (ECC) values less than 0.1 that ensures very good diversity performance.

The present disclosure also presents a triangular printed wideband Yagi-based MIMO antenna system. The proposed Yagi-based MIMO antenna system introduces the generation of multiple beams from a single Yagi port excitation for compact wireless access points, as compared to the multiple beams achieved by using multiple elements or ports in the related technologies. A simple concept for splitting the single main end-fire directional beam of a typical Yagi-Uda antenna into multiple beams is proposed. The multiple beams from a single element are generated by a careful excitation in loop resonance mode without compromising the Yagi performance metrics such as high front-to-back ratio (FBR), gain, directivity, efficiency, and bandwidth. The proposed Yagi-based MIMO antenna system has high directional radiation characteristics with a high FBR, gain, and directivity. It also ensures very good MIMO performance in terms of port coupling and channel correlation for compact wireless terminals.

Aspects of the disclosure also provide methods for constructing an orthogonally polarized Yagi-like MIMO antenna system and a triangular printed wideband Yagi-based MIMO antenna system, respectively.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5A shows the 3D gain pattern for the input port 1 of the wideband compact Yagi-like directional MIMO antenna system 100 according to an embodiment of the disclosure;

FIG. 5B shows the 3D gain pattern for the input port 2 of the wideband compact Yagi-like directional MIMO antenna system 100 according to an embodiment of the disclosure;

FIG. 5C shows the 3D gain pattern for the input port 3 of the wideband compact Yagi-like directional MIMO antenna system 100 according to an embodiment of the disclosure;

FIG. 5D shows the 3D gain pattern for the input port 4 of the wideband compact Yagi-like directional MIMO antenna system 100 according to an embodiment of the disclosure;

FIG. 10A shows the simulated realized gain and total radiation efficiency curves for the loop element 701 of the triangular printed wideband Yagi based MIMO antenna system 700 according to an embodiment of the disclosure;

FIG. 10B shows the simulated realized gain and total radiation efficiency curves for the loop element 702 of the triangular printed wideband Yagi based MIMO antenna system 700 according to an embodiment of the disclosure;

FIG. 10C shows the simulated realized gain and total radiation efficiency curves for the loop element 703 of the triangular printed wideband Yagi based MIMO antenna system 700 according to an embodiment of the disclosure;

FIG. 11A shows the 3D gain pattern for the loop element 701 of the triangular printed wideband Yagi based MIMO antenna system 700 according to an embodiment of the disclosure;

FIG. 11B shows the 3D gain pattern for the loop element 702 of the triangular printed wideband Yagi based MIMO antenna system 700 according to an embodiment of the disclosure;

FIG. 11C shows the 3D gain pattern for the loop element 703 of the triangular printed wideband Yagi based MIMO antenna system 700 according to an embodiment of the disclosure;

DETAILED DESCRIPTION

Figure 1:
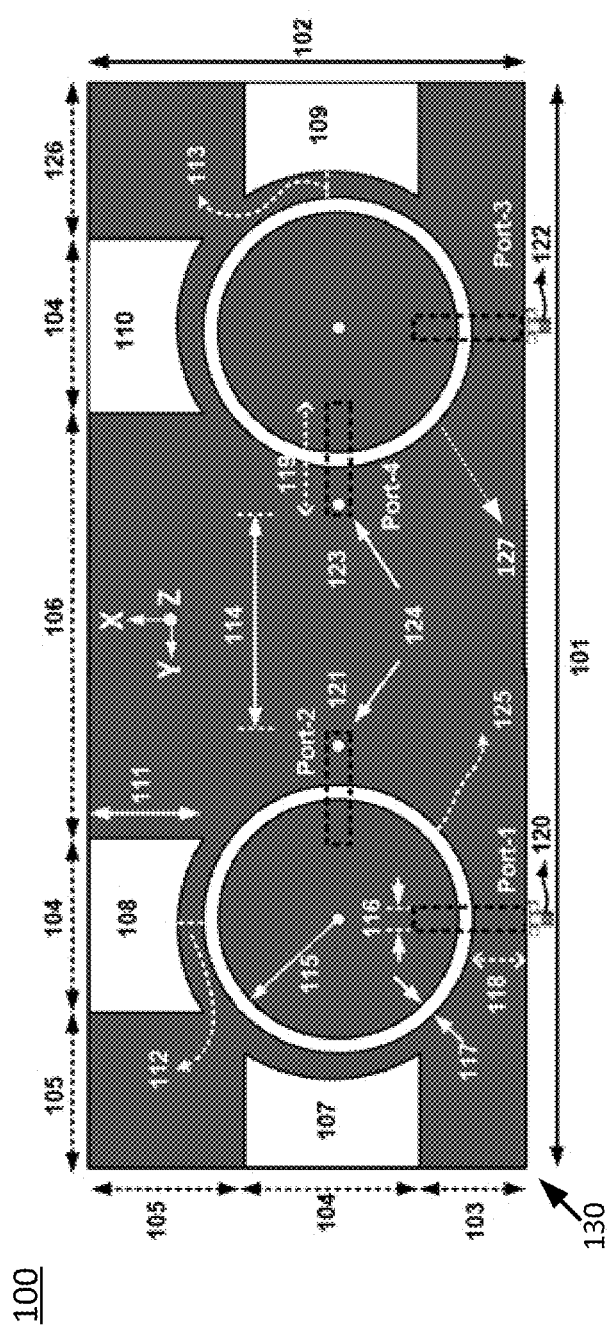
FIG. 1 shows a top view of a wideband compact Yagi-like directional MIMO antenna system 100 according to an embodiment of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to a system, device, and method for multi-beam Yagi-based MIMO antenna systems. The generalized concept of the present disclosure, with suitable modifications, is applicable to various antenna systems, devices, methods for wireless terminals. The present disclosure will be described in detail herein with reference to the exemplary embodiments of a wideband compact Yagi-like directional MIMO antenna system and a triangular printed wideband Yagi based MIMO antenna system, although the disclosure is not necessarily limited to such topologies.

This disclosure exploits the features of the loop excitation in a Yagi fashion to generate orthogonally polarized beams. A dual feeding technique can be used to generate orthogonally polarized beams from a single loop element. The proposed technique is simple as compared to other complex orthogonally polarized techniques presented in related technologies. The bandwidth can be increased by exciting a certain guide wavelength (e.g., 1.3 $\lambda$g) in loop resonance mode. This bandwidth enhancement technique is also very simple as compared to the complex bandwidth enhancement techniques presented in other technologies. The omnidirectional orthogonal beams of the single loop element can be made directional by using compact reflector elements such as a complementary slot reflector (CSR) unlike the aforementioned complex back-lobe reduction techniques that are commonly used in related technologies. The present disclosure also introduces a single layer orthogonally polarized MIMO antenna system in a Yagi configuration with directional beams, wider bandwidth, and compact size. Due to the directional orthogonal beams, the design has a very low correlation between the fields and ensures very good diversity performance. The proposed design is suitable for WiMAX integrated wireless devices, wireless modems, and other compact handheld devices and smart phones. The details of the proposed antenna system will be described with corresponding figures.

According to embodiments of the disclosure, a proposed wideband compact Yagi-like directional MIMO antenna system includes at least one loop element.

FIG. 1 shows a top view of a proposed wideband compact Yagi-like directional MIMO antenna system 100 according to an embodiment of the disclosure. The antenna system 100 includes a substrate 130 and two slot round loop elements 125 and 127. The substrate 130 has a top side and a bottom side. The two slot round loop elements 125 and 127 are placed on the top side of the substrate and separated by a certain distance. Each slot round loop elements has a radius 115 and a thickness 117. In the same or another embodiment, the radius 115 is 9.3 mm and the thickness is 1.2 mm.

According to embodiments of the disclosure, in a proposed wideband compact Yagi-like directional MIMO antenna system, one of the at least one loop element can have at least two input ports and one of the at least two input ports can be placed in a direction orthogonal to another one of the at least two input ports.

Reference to FIG. 1, two input ports 120 and 121 are for the slot round loop element 125, and two input ports 122 and 123 are for the slot round loop element 127. For each slot round loop element, one input port is placed in a direction orthogonal to the other input port to generate orthogonally polarized beams from the single slot round loop element. For example, for the slot round loop element 125, the input port 120 is placed orthogonally to the other input port 121. It is noted that the two ports have to be at 90° degrees with respect to each other to achieve orthogonal beams that are uncorrelated in the far-field. However, for any other applications where orthogonality is not of the utmost importance, the relative placement between the ports can be changed keeping in view that the position of the CSR elements 107 and 108 (or 109 and 110) have to be optimized accordingly. Each input port connects the corresponding slot round loop element through a microstrip line on the back side of the antenna system 100. Each microstrip line has a length 119 and a width 116. In the same or another embodiment, the length 119 can be 9 mm and the width 116 can be 1.9 mm.

According to embodiments of the disclosure, in a proposed wideband compact Yagi-like directional MIMO antenna system, two input ports placed orthogonally to each other can be excited by a certain guide wavelength (preferably 1.1-1.5 $\lambda$g) in a loop resonance mode.

Still reference to FIG. 1, each input port is excited by a guide wavelength 1.3 $\lambda$g in a loop resonance mode through a SMA connector to increase the bandwidth of the antenna system 100. For the input ports 120 and 122, the SMA connectors are attached at an edge of the substrate 130. For the input ports 121 and 123, the SMA connectors are attached through two vias 124.

According to embodiments of the disclosure, in a proposed wideband compact Yagi-like directional MIMO antenna system, each of the two input ports placed orthogonally to each other can associate with at least one reflector element.

Still reference to FIG. 1, each slot round loop element has two compact complementary slot reflector (CSR) elements and each CSR element corresponds to one of the two input ports placed orthogonally to each other. For example, the slot round loop element 125 has a CSR element 107 for the input port 121 and a CSR element 108 for the input port 120, and the slot round loop element 127 has a CSR element 109 for the input port 123 and a CSR element 110 for the input port 122. Each CSR element has a length 104 and a width 111. In the same or another embodiment, the length 104 can be 14 mm and the width 111 can be 9.2 mm. In addition, in the embodiment as shown in FIG. 1, the CSR elements are placed on the top side of the substrate 130.

According to embodiments of the disclosure, in a proposed wideband compact Yagi-like directional MIMO antenna system, for one of the two input ports placed orthogonally to each other, one of the at least one reflector element associated with the input port can be placed in a direction opposite to the input port. Since one of the two input ports can be placed orthogonally to the other one of the two input ports, the reflector element opposite to the one of the two input ports can also be placed orthogonally to the reflector element opposite to the other one of the two input ports.

Still reference to FIG. 1, each CSR element is placed opposite to the input port associated with the CSR element. For example, the CSR element 107 is placed opposite to the input port 121. Accordingly, for each slot round loop element, one CSR element is placed orthogonally to the other CSR element. For example, for the slot round loop element 125, the CSR element 107 is placed orthogonally to the other CSR element 108. By placing two CSR elements orthogonally around the slot round loop element, the omnidirectional orthogonal beams of the slot round loop element are made directional.

According to embodiments of the disclosure, in a proposed wideband compact Yagi-like directional MIMO antenna system, the substrate of the proposed antenna system can be realized by a single layer or a multi-layer laminate with low loss and good RF performance.

Still reference to FIG. 1, the substrate 130 of the antenna system 100 is realized by a single layer Roger substrate R04350. The Roger substrate R04350 can have a thickness of 0.76 mm, a dielectric constant of 3.48, and a loss tangent of 0.004. The substrate 130 has a length 101 and a width 102. In the same or another embodiment, the length 101 can be 90 mm and the width 102 can be 35 mm. In addition, other dimensions, such as the location and spacing of these CSR elements, can be fully optimized to achieve directional horizontal and vertical polarized beams. In the same or another embodiment, other dimensions can be 103 (8.5 mm), 105 (12.5 mm), 106 (36 mm), 126 (13.5 mm), 114 (20 mm), and 118 (4.5 mm).

Figure 2:
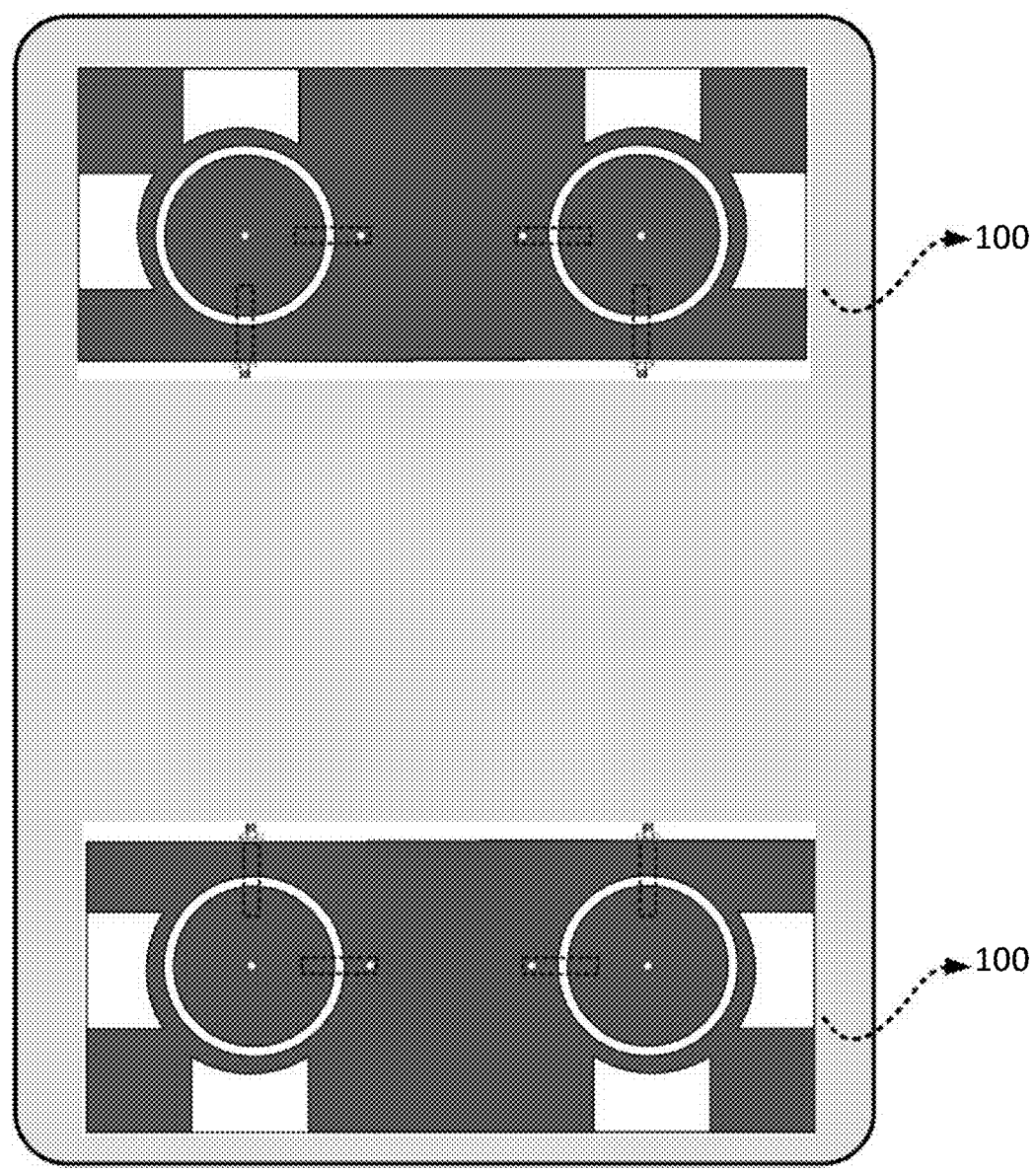
FIG. 2 shows a setup of the two wideband compact Yagi-like directional MIMO antenna systems 100 inside a wireless terminal 200 according to an embodiment of the disclosure.

In an embodiment, a plurality of the proposed wideband compact Yagi-like directional MIMO antenna systems can be placed together inside a wireless device to achieve better performance. For example, FIG. 2 shows a setup of the two proposed wideband compact Yagi-like directional MIMO antenna systems 100 inside a wireless terminal 200.

It is noted that the geometry parameters of a proposed wideband compact Yagi-like directional MIMO antenna system are frequency dependent. Therefore, the geometry parameters can vary as an operating frequency of the proposed antenna system changes. That is, the exemplary geometry parameters of the embodiment as shown in the FIG. 1 may vary in other embodiments. The results shown in FIGS. 3-6 are based on the geometry parameters of the embodiment as shown in the FIG. 1. However, the results may vary as the operating frequency of the proposed antenna system changes in other embodiments.

Figure 3B:
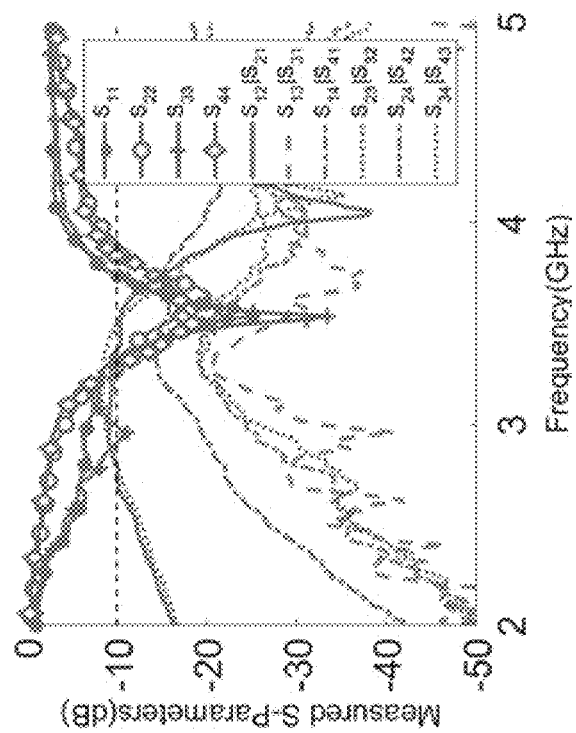
FIG. 3B shows the measured S-parameter curves of the proposed wideband compact Yagi-like directional MIMO antenna system 100 according to an embodiment of the disclosure.
Figure 3A:
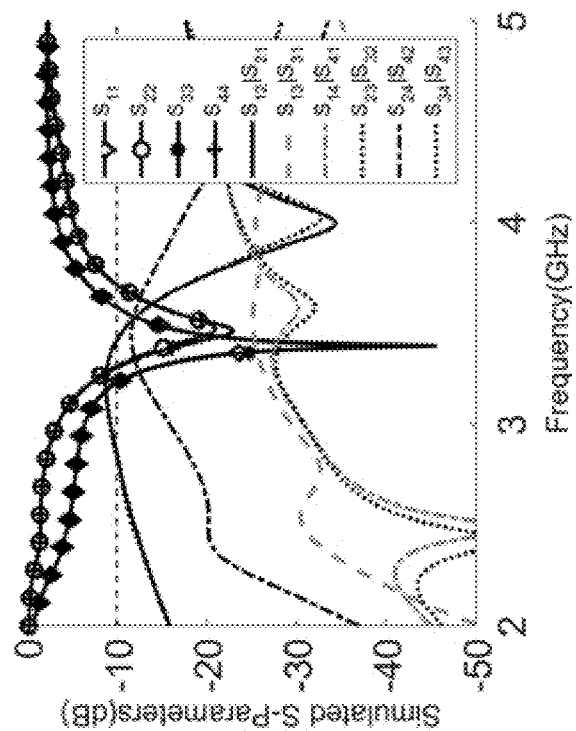
FIG. 3A shows the simulated S-parameter curves of the wideband compact Yagi-like directional MIMO antenna system 100 according to an embodiment of the disclosure.

FIGS. 3A and 3B show the simulated and measured S-parameter curves of the proposed wideband compact Yagi-like directional MIMO antenna system 100, respectively, according to an embodiment of the disclosure. The design parameters of the embodiment as shown in FIG. 1 are modeled and simulated in HFSS™. In FIG. 3B, it can be seen that the proposed antenna system 100 has a measured bandwidth of 620 MHz (3.26-3.88 GHz) when a return loss (e.g., $S_{11}$, $S_{22}$, $S_{33}$, and $S_{44}$) is −10 dB. In addition, it can also be seen that the minimum return loss is below −30 dB, the minimum isolation between input ports 1 and 2 ($S_{12}|S_{21}$) is around −10 dB, the minimum isolation between input ports 3 and 4 ($S_{34}|S_{43}$) is around 10 dB, the minimum isolation between input ports 2 and 4 ($S_{24}|S_{42}$) is around −15 dB, the minimum isolation between input ports 1 and 3 ($S_{13}|S_{31}$) is around −20 dB, the minimum isolation between input ports 1 and 4 ($S_{14}|S_{41}$) is around −20 dB, and the minimum isolation between input ports 2 and 3 ($S_{23}|S_{32}$) is around −20 dB. Overall, a good agreement between the simulated and measured results is observed.

Figure 4A:
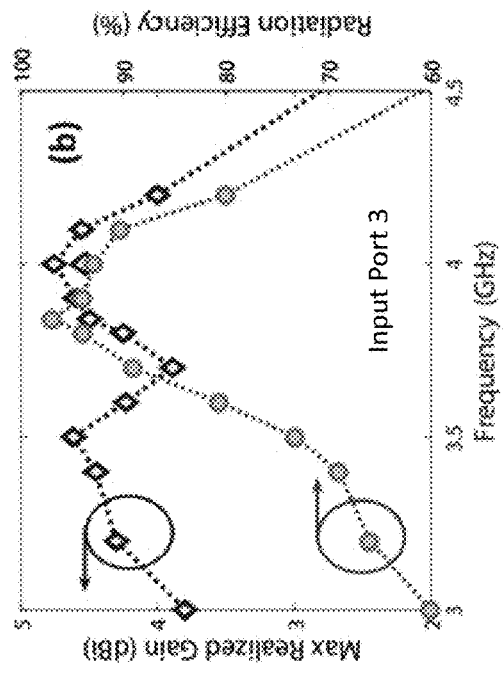
FIG. 4A show the simulated realized gain and total radiation efficiency curves for the input port 1 of the wideband compact Yagi-like directional MIMO antenna system 100 according to an embodiment of the disclosure.
Figure 4B:
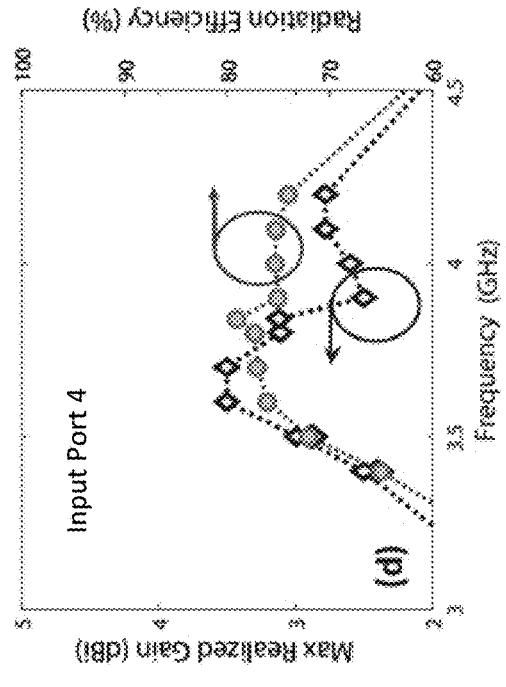
FIG. 4B shows the simulated realized gain and total radiation efficiency curves for the input port 3 of the wideband compact Yagi-like directional MIMO antenna system 100 according to an embodiment of the disclosure.
Figure 4C:
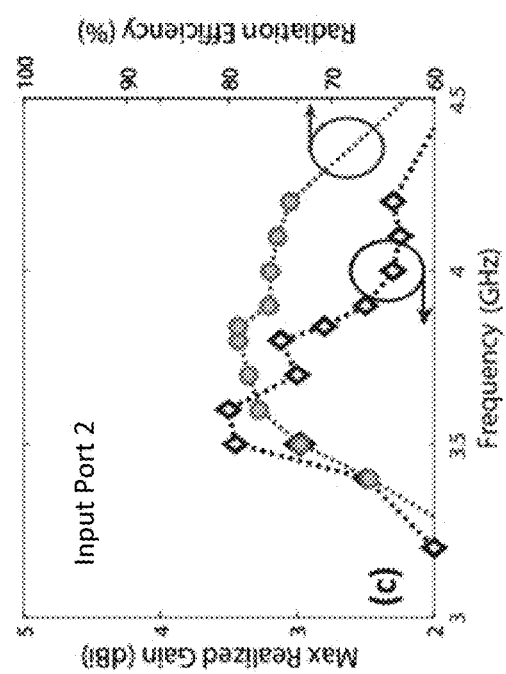
FIG. 4C shows the simulated realized gain and total radiation efficiency curves for the input port 2 of the wideband compact Yagi-like directional MIMO antenna system 100 according to an embodiment of the disclosure.
Figure 4D:
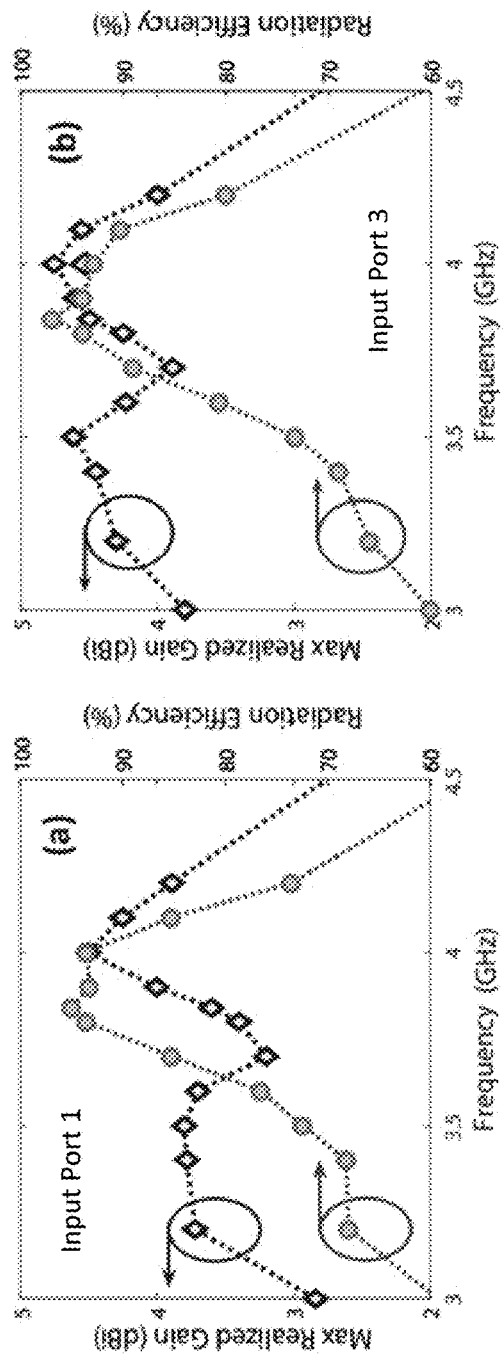
FIG. 4D shows the simulated realized gain and total radiation efficiency curves for the input port 4 of the wideband compact Yagi-like directional MIMO antenna system 100 according to an embodiment of the disclosure.

FIGS. 4A-4D show the simulated realized gain and total radiation efficiency curves of the proposed wideband compact Yagi-like directional MIMO antenna system 100 according to an embodiment of the disclosure. The design parameters of the embodiment as shown in FIG. 1 are modeled and simulated in HFSS™. FIGS. 4A and 4B show the simulated realized gain and total radiation efficiency curves for the input ports 1 and 3, respectively. FIGS. 4C and 4D show the simulated realized gain and total radiation efficiency curves for the input ports 2 and 4, respectively. In FIGS. 4A and 4B, it can be seen that the proposed antenna system 100 has a maximum gain of more than 3.5 dBi for the input ports 1 and 3 at the center frequency of operation (3.6 GHz). The total radiation efficiency has a minimum of 70% for Ports 1 & 3 and can reaches to 90% at 3.75 GHz for Ports 1 & 3.

FIGS. 5A-5D show the 3D gain patterns of the proposed wideband compact Yagi-like directional MIMO antenna system 100 according to an embodiment of the disclosure. The design parameters of the embodiment as shown in FIG. 1 are modeled and simulated in HFSS™. The operating frequency in this simulation is set to 3.6 GHz. FIGS. 5A and 5C show the 3D gain patterns for the input ports 1 and 3, respectively, while FIGS. 5B and 5D show the 3D gain patterns for the input ports 2 and 4, respectively. It can be seen that the maximums of these patterns are tilted towards different directions and are apart from each other, indicating very low correlation between the radiated fields for these ports. For example, the maximum gain of the input port 1 tilts to 90° while the maximum gain of the input 3 tilts to 270°.

Figure 6B:
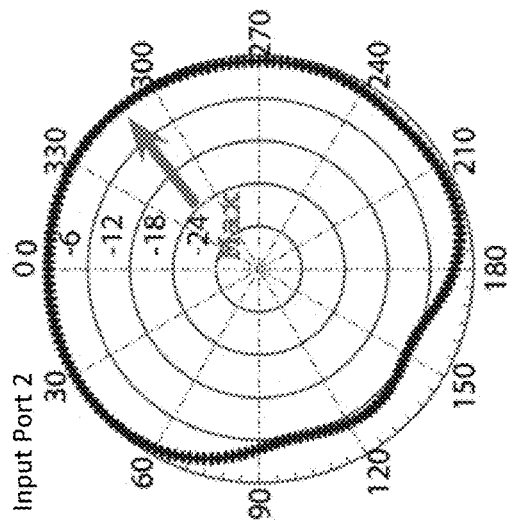
FIG. 6B shows the two dimensional normalized radiation pattern in the horizontal X-Y plane for the input port 2 of the wideband compact Yagi-like directional MIMO antenna system 100 according to an embodiment of the disclosure.
Figure 6D:
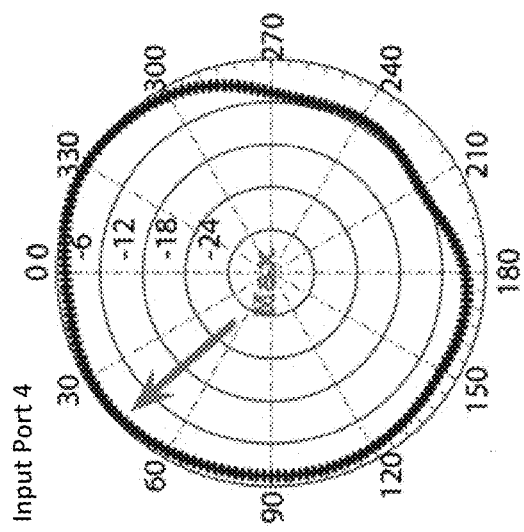
FIG. 6D shows the two dimensional normalized radiation pattern in the horizontal X-Y plane for the input port 4 of the wideband compact Yagi-like directional MIMO antenna system 100 according to an embodiment of the disclosure.
Figure 6A:
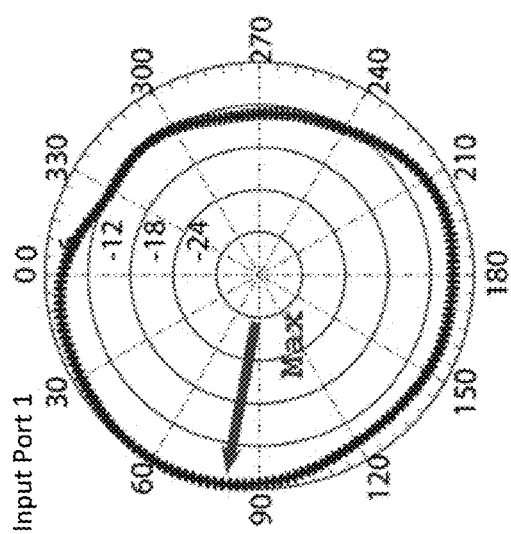
FIG. 6A shows the two dimensional normalized radiation pattern in the horizontal X-Y plane for the input port 1 of the wideband compact Yagi-like directional MIMO antenna system 100 according to an embodiment of the disclosure.
Figure 6C:
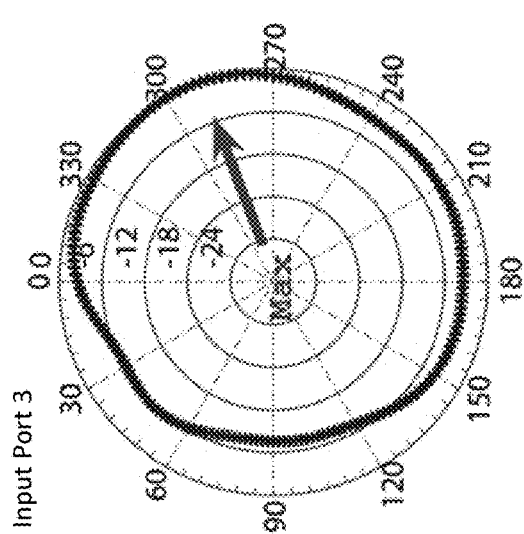
FIG. 6C shows the two dimensional normalized radiation pattern in the horizontal X-Y plane for the input port 3 of the wideband compact Yagi-like directional MIMO antenna system 100 according to an embodiment of the disclosure.

FIGS. 6A-6D show the two dimensional normalized radiation patterns in the horizontal X-Y plane of the proposed wideband compact Yagi-like directional MIMO antenna system 100 according to an embodiment of the disclosure. The design parameters of the embodiment as shown in FIG. 1 are modeled and simulated in HFSS™. The operating frequency in this simulation is set to 3.6 GHz. FIGS. 6A and 6C show the normalized radiation patterns for the input ports 1 and 3, respectively. It can be seen that the maximums of the beams are apart from each other by almost 150° for the input ports 1 and 3. Similarly, for the input ports 2 and 4, the maximums of the beams are separated by 90° as shown in FIGS. 6B and 6D, respectively. For all the input ports, the maximums of the beams are separated by a minimum of 30°. This ensures that the orthogonal beams of the proposed MIMO antenna system are highly uncorrelated, so that a good MIMO performance can be obtained.

In an embodiment, to evaluate the diversity performance of the proposed antenna system 100, the ECC values are computed for all the ports from the measured 3D radiated fields. It is found that the maximum ECC value is 0.0928 between all the ports of the antenna system 100 and is below a standard ECC value of 0.5 that is defined for a good MIMO performance. The minimum FBR of the proposed MIMO antenna system 100 is more than 7 dB while the minimum FBR reaches to 13.5 dB at 3.75 GHz, which also ensures high directional radiation performance.

According to embodiments of the disclosure, a method of constructing an orthogonally polarized Yagi-like MIMO antenna system is presented. The method can form at least one loop element on a top side of a substrate and one of the at least one loop element can have at least two input ports. The method can couple one of the at least two input ports to the corresponding loop element through a microstrip line that is on a bottom side of the substrate. The method can further place one of the at least two input ports in a direction that is orthogonal to another one of the at least two input ports. The method can excite an input port with a certain guide wavelength such as 1.3 kg in a loop resonance mode. For each of the two input ports placed orthogonally to each other, the method can place one reflector element in a direction that is opposite to the respective input port, such that the reflector element opposite to one input port is placed orthogonally to the reflector element opposite to the other input port. The method can place the two slot reflector on the top side of the substrate.

The present disclosure also presents a triangular printed wideband Yagi based MIMO antenna system. The triangular printed wideband Yagi based MIMO antenna system can introduce the generation of multiple beams from a single Yagi port excitation, unlike the designs in related technologies, where multiple beams are achieved by using multiple elements or ports. The triangular printed wideband Yagi based MIMO antenna system of the present disclosure can split the single main end-fire directional beam of a typical Yagi-Uda antenna into multiple beams. The multiple beams from a single element can be generated by exciting a certain guide wavelength in a loop resonance mode without compromising the Yagi performance metrics such as FBR, gain, directivity, efficiency, and bandwidth. The triangular printed wideband Yagi based MIMO antenna system has high directional radiation characteristics with a high FBR, high gain, and high directivity. This ensures very good MIMO performance in terms of port coupling and channel correlation for compact wireless terminals.

The triangular printed wideband Yagi based MIMO antenna system can be a single layer antenna with multi-beam elements as compared to the multiple layer non-Yagi related MIMO antenna systems that covers different sectors by employing complex 3D structures in related technologies. The multiple beams can be meticulously optimized such that the adjacent beams do not interfere and degrade the performance of the neighboring beams. The triangular printed wideband Yagi based MIMO antenna system can use a simple microstrip line feeding as well as a simple and compact ground plane reflector element to achieve high FBR as compared to the related technologies where complex feeding and back-lobe reduction techniques are used. The triangular printed wideband Yagi based MIMO antenna system has a compact size, wide bandwidth, high port isolation, and low field correlation with high gain and efficiency values. The details of the triangular printed wideband Yagi based MIMO antenna system will be described with corresponding figures.

According to embodiments of the disclosure, a proposed triangular printed wideband Yagi based MIMO antenna system can include three loop elements on the same side of a substrate. The design is targeted for MIMO sectoral applications. Each of the three loop elements is placed at a certain angle with respect to other two loop elements.

Figure 7:
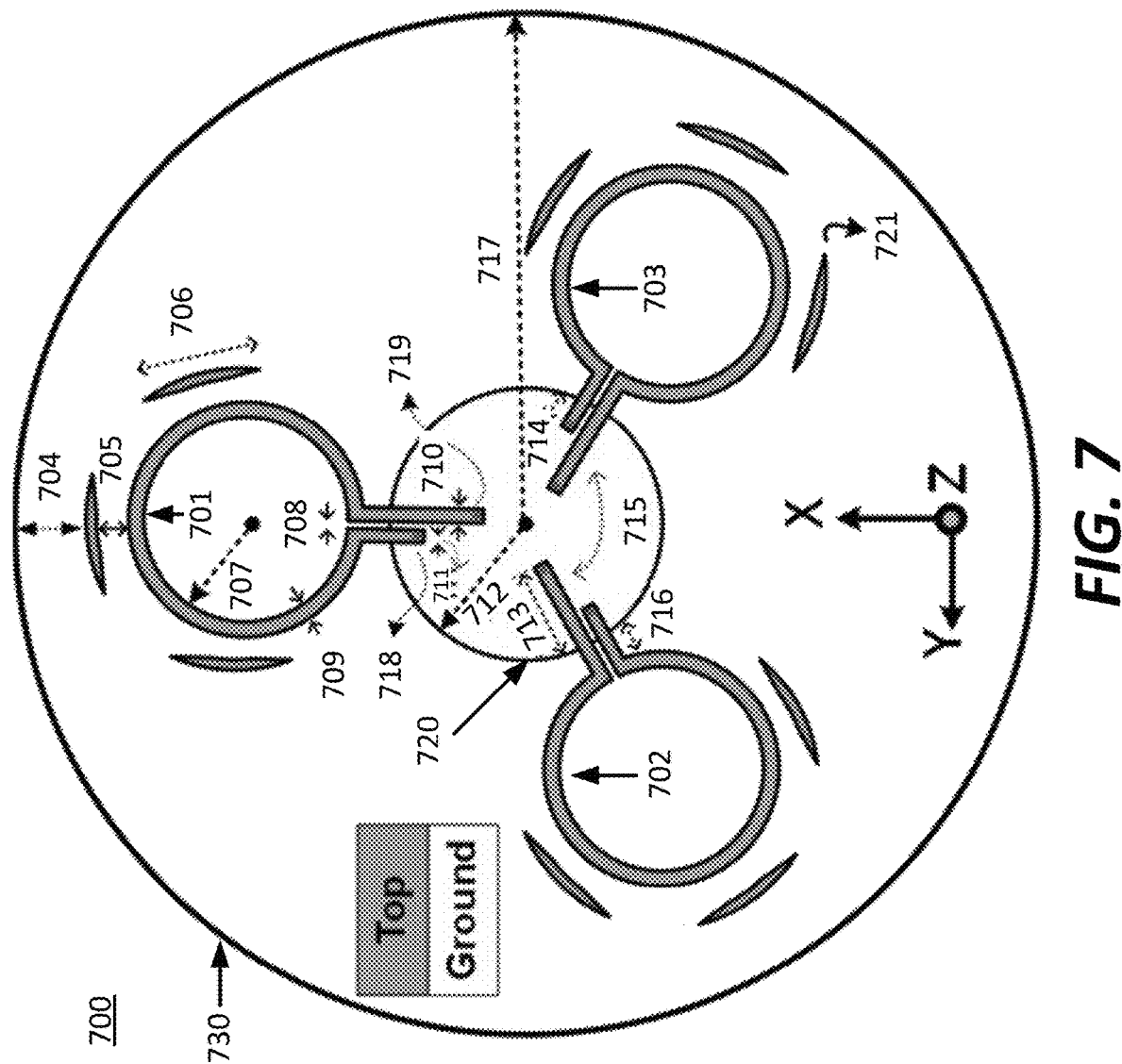
FIG. 7 shows a top view of a triangular printed wideband Yagi based MIMO antenna system 700 according to an embodiment of the disclosure.

FIG. 7 shows a top view of a proposed triangular printed wideband Yagi based MIMO antenna system 700 according to an embodiment of the disclosure. The MIMO antenna system 700 includes a substrate 730 and three round loop elements: 701, 702, and 703. The substrate 730 has a top side and a bottom side. The three round loop elements are placed on the stop side of the substrate 730 at an angle 715 with respect to each other. Each round loop element has a thickness 709 and a radius 707. In the same or another embodiment, the angle 715 can be 120°, the thickness 709 can be 1.8 mm, and the radius 707 can be 12.85 mm.

According to embodiments of the disclosure, in a proposed triangular printed wideband Yagi based MIMO antenna system, each of the three loop elements can associate with at least one parasitic director.

Reference to FIG. 7, each round loop element of the proposed antenna system 700 associates with three parasitic directors 721 on the top side of the substrate 730. The parasitic directors of each round loop element can increase the radiation pattern in a given direction. In the same or another embodiment, each parasitic director can have a length 706 of 14.4 mm. The spacing 705 between the parasitic director and the corresponding round loop element can be 3.35 mm.

According to embodiments of the disclosure, a proposed triangular printed wideband Yagi based MIMO antenna system can include at least one reflector, such that one end of a loop element of the proposed antenna system can couple to one of the at least one reflector.

Still reference to FIG. 7, the proposed antenna system 700 includes a circular parasitic reflector 720 (i.e., a ground plane) on the bottom side of the substrate 730. In the same or another embodiment, the spacing 716 between a round loop element and the circular reflector 720 can be 3.2 mm.

Each round loop element has two ends, where one end of the two ends is coupled to an input port and the other end of the two ends is coupled to the circular reflector 720. For example, for the round loop element 701, one end 719 is coupled to the corresponding input port through an SMA connector through a via in the ground plane, and the other end 718 is shorted to the circular reflector 720 (i.e., the ground plane) through a via. In the same or another embodiment, a length 713 and a thickness 710 of the long leg can be 11 mm and 1.6 mm, respectively, and a length 714 and a thickness 711 of the short leg can be 3.6 mm and 1.5 mm, respectively. The spacing 708 between the two loop legs can be 0.9 mm.

According to embodiments of the disclosure, in a proposed triangular printed wideband Yagi based MIMO antenna system, the substrate of the proposed antenna system can be realized by a single layer or a multi-layer laminate with low loss and good RF performance.

Still reference to FIG. 7, the substrate of the antenna system 700 can be realized by a Roger substrate RO4350. The Roger substrate RO4350 can have a thickness of 0.76 mm, a dielectric constant of 3.48, and a loss tangent of 0.004. In addition, other dimensions, such as a total radius 717 of the proposed antenna system 700 and a spacing 704 between the parasitic director and outer surface of the antenna system 700 can be fully optimized to achieve high directional radiation performance. In the same or another embodiment, the total radius 717 of the antenna system 700 can be 60 mm and the spacing 704 between the parasitic director and outer surface of the antenna system 700 can be 8.2 mm.

Figure 8:
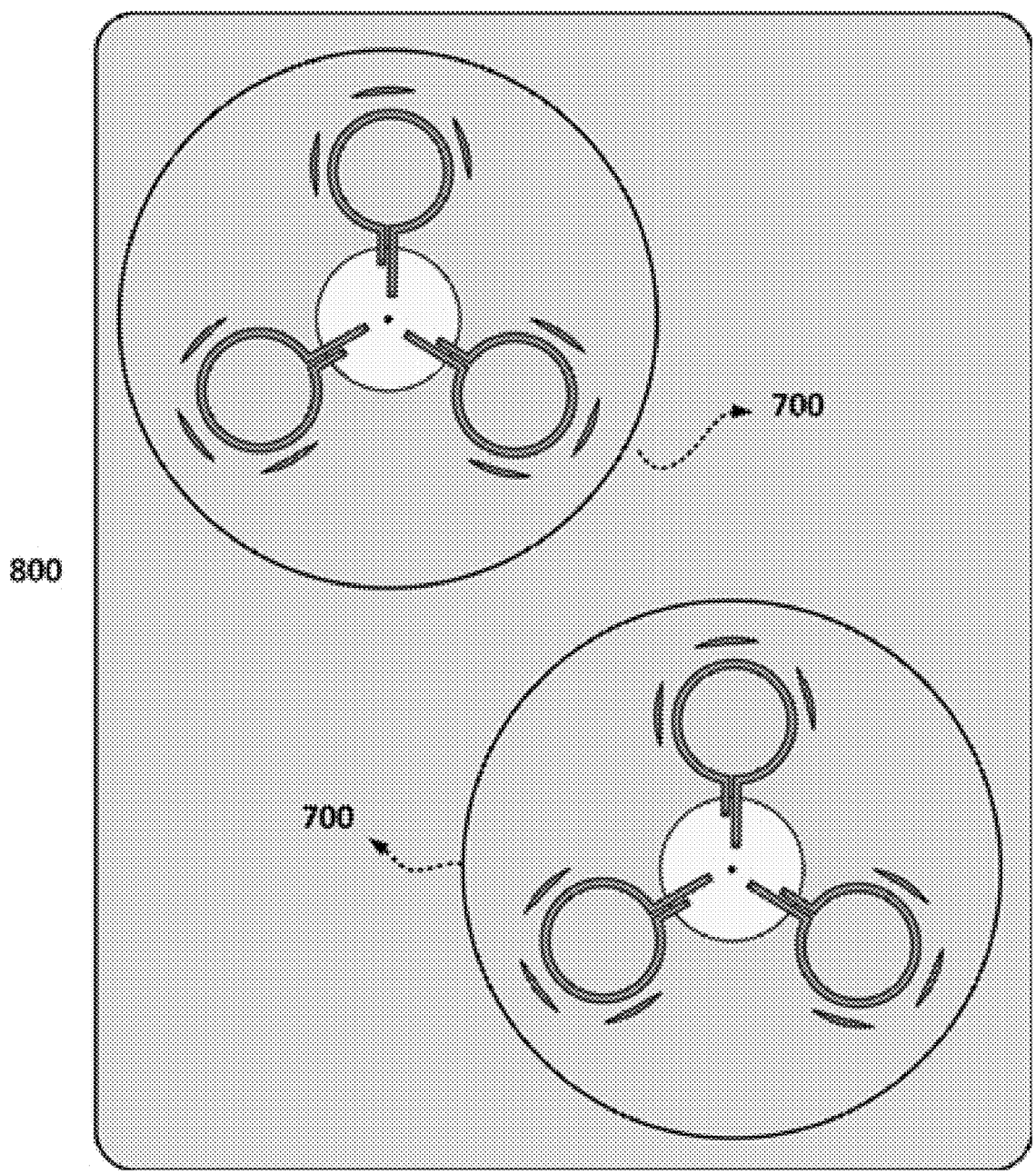
FIG. 8 shows a setup of two triangular printed wideband Yagi based MIMO antenna systems 700 inside a wireless terminal 800 according to an embodiment of the disclosure.

In an embodiment, a plurality of the proposed triangular printed wideband Yagi based MIMO antenna systems can be placed together inside a wireless device to achieve better performance. For example, a setup of two proposed triangular printed wideband Yagi based MIMO antenna systems 700 inside a wireless terminal 800 is shown in FIG. 8.

Figure 9:
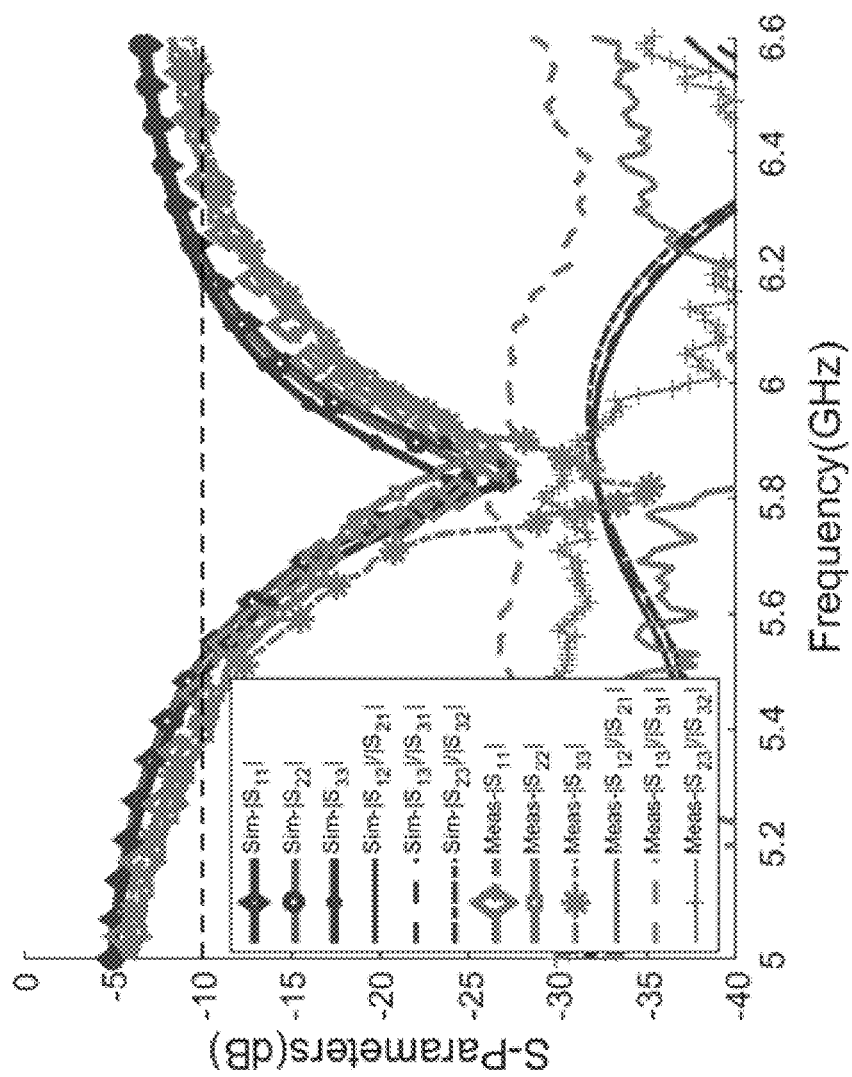
FIG. 9 shows the simulated and measured S-parameters curves of the triangular printed wideband Yagi based MIMO antenna system 700 according to an embodiment of the disclosure.

It is noted that the geometry parameters of a proposed triangular printed wideband Yagi based MIMO antenna system are frequency dependent. Therefore, the geometry parameters can vary as an operating frequency of the proposed antenna system changes. That is, the exemplary geometry parameters of the embodiment as shown in the FIG. 7 may vary in other embodiments. The results shown in FIGS. 9-12 are based on the geometry parameters of the embodiment as shown in the FIG. 7. However, the results may vary as the operating frequency of the proposed antenna system changes in other embodiments. FIG. 9 shows the simulated and measured S-parameters curves of the proposed MIMO antenna system 700 according to an embodiment of the disclosure. The design parameters of the embodiment as shown in FIG. 7 are modeled and simulated in HFSS™. The proposed MIMO antenna system 700 has a measured bandwidth of 950 MHz (5.4-6.35 GHz) when a return loss (e.g., $S_{11}$, $S_{22}$, and $S_{33}$) is −10 dB. The minimum return loss is around −26 dB. The proposed MIMO antenna system 700 has a high measured isolation that is greater than 28 dB within the entire band of operation between any two of the three ports. FIG. 9 indicates that the simulation and measurement results are in good agreement.

FIGS. 10A-10C show the simulated realized gain and total radiation efficiency curves of the proposed MIMO antenna system 700 according to an embodiment of the disclosure. The design parameters of the embodiment as shown in FIG. 7 are modeled and simulated in HFSS™. FIGS. 10A, 10B, and 10C show these curves for the round loop elements 701, 702, and 703, respectively. The antenna system 700 has a maximum gain of 5 dBi and high radiation efficiency of around 95% at the center frequency of operation (5.875 GHz).

FIGS. 11A-11C show the 3D gain patterns of the proposed MIMO antenna system 700 according to an embodiment of the disclosure. The design parameters of the embodiment as shown in FIG. 7 are modeled and simulated in HFSS™. The operating frequency is set to 5.8 GHz. FIGS. 11A, 11B, and 11C show these patterns for the round loop elements 701, 702, and 703, respectively. It can be seen that the beams of the three elements are pointing towards different directions and are apart from each other by 120°. Therefore, it is indicated that the patterns of the MIMO antenna system are highly uncorrelated.

Figure 12A:
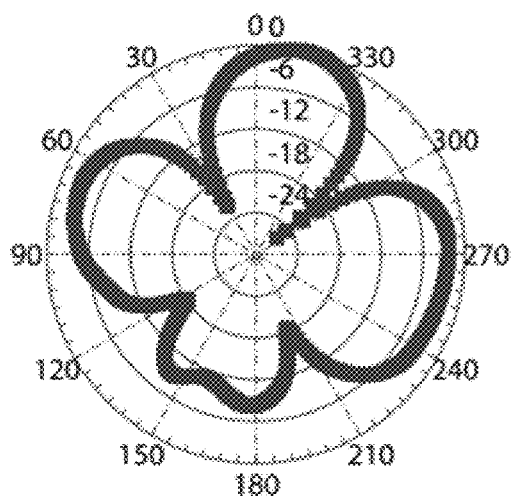
FIG. 12A shows the two dimensional normalized radiation pattern in the X-Y plane at $\theta=90°$ for the loop element 701 of the triangular printed wideband Yagi based MIMO antenna system 700 according to an embodiment of the disclosure.
Figure 12B:
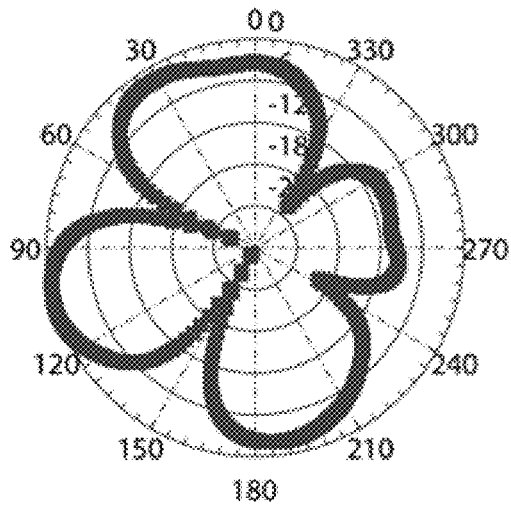
FIG. 12B shows the two dimensional normalized radiation pattern in the X-Y plane at $\theta=90°$ for the loop element 702 of the triangular printed wideband Yagi based MIMO antenna system 700 according to an embodiment of the disclosure.
Figure 12C:
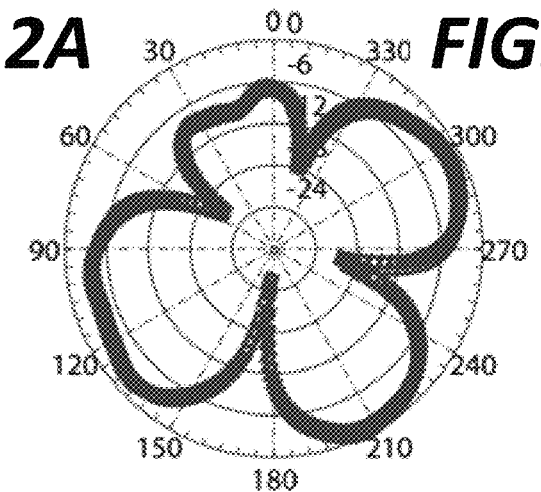
FIG. 12C shows the two dimensional normalized radiation pattern in the X-Y plane at $\theta=90°$ for the loop element 703 of the triangular printed wideband Yagi based MIMO antenna system 700 according to an embodiment of the disclosure.
Figure 12D:
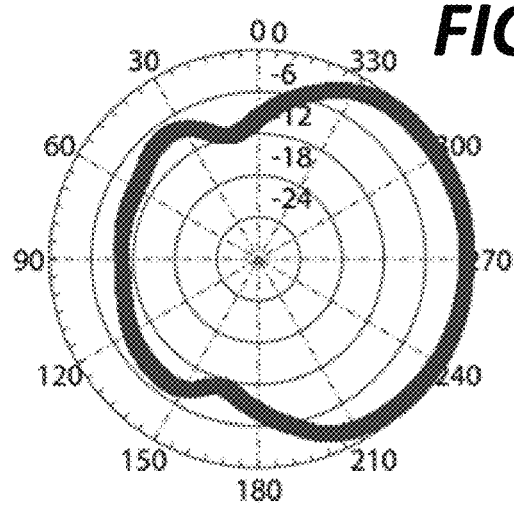
FIG. 12D shows the two dimensional normalized radiation pattern in the elevation plane computed at respective maximum $\varphi$ values for the loop elements 701 and 703 of the triangular printed wideband Yagi based MIMO antenna system 700 according to an embodiment of the disclosure.
Figure 12E:
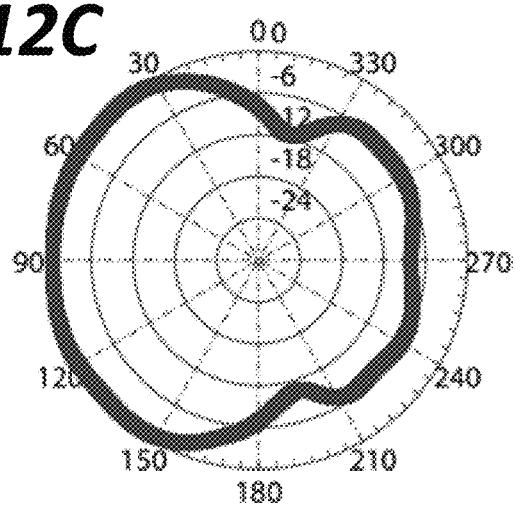
FIG. 12E shows the two dimensional normalized radiation pattern in the elevation plane computed at maximum $\varphi$ value for the loop element 702 of the triangular printed wideband Yagi based MIMO antenna system 700 according to an embodiment of the disclosure.

FIGS. 12A-12E show the two dimensional normalized radiation patterns of the proposed MIMO antenna system 700 according to an embodiment of the disclosure. The design parameters of the embodiment as shown in FIG. 7 are modeled and simulated in HFSS™. The operating frequency is set to 5.8 GHz. FIGS. 12A, 12B, and 12C show these patterns for the round loop elements 701, 702, and 703, respectively, in the azimuth (X-Y) plane at $\theta=90°$, while FIG. 12D shows these patterns for the round loop elements 701 and 703 in the elevation plane computed at their respective maximum $\varphi$ values, and 12E show these patterns for the loop element 702 in the elevation plane computed at its maximum $\varphi$ values. As shown in FIG. 12A-12C, the main middle beams of the round loop elements 701, 702, and 703 point to around 345°, 105°, and 210°, respectively. Therefore, it can be seen that the main middle beam of each loop element is apart from the main middle beams of the two adjacent round loop elements by almost 120° due to the geometry configuration of the antenna system 700. In addition, for each round loop element, the maximums of the two adjacent beams are separated from each other by at least 70°. For example, the respective maximums of the three beams of the round loop element 703 point to around 135°, 210°, and 295°, respectively, as shown in FIG. 12C. Therefore, it can be seen that the multiple beams of each round loop element do not affect the performance of adjacent beams. The minimum FBR of the proposed MIMO antenna system 700 in both planes is 14 dB at 5.8 GHz, which also ensures high directional radiation performance. The FBR is also calculated at other frequencies and it is found that the minimum value is 14 dB.

According to embodiments of the disclosure, a method of constructing a triangular printed wideband Yagi based MIMO antenna system is presented. The method can form three loop elements on a top side of a substrate and each of the three loop elements can be placed at a certain angle such as 120° with respect to other two loop elements. The method can further form at least one reflector and place one of the at least one reflector on a bottom side of the substrate. Each of the three round loop elements can have two ends. The method can couple one end of the two ends to an input port and couple the other end of the two ends to one of the at least one circular reflector that is placed on the bottom side of the substrate. The method can excite an input port with a certain guide wavelength (preferably 3.1-3.9 $\lambda$g) such as 3.5 $\lambda$g in a loop resonance mode. In addition, for each loop element, the method can form at least one parasitic director on the top side of the substrate.

While the circuit topologies, the control strategies, and the methods illustrated above apply to a wideband compact Yagi-like directional MIMO antenna system and a triangular printed wideband Yagi based MIMO antenna system, all of these can be adapted to other multi-beam MIMO antenna systems without deviating from the scope of the present disclosure.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. An orthogonally polarized Yagi-like MIMO antenna system, comprising:
    a substrate having a top side and a bottom side; and
    at least one loop element on the top side of the substrate,
        wherein one of the at least one loop element has at least two input ports,
    wherein for the one of the at least one loop element having at least two input ports, one of the at least two input ports is placed in a direction that is orthogonal to another one of the at least two input ports such that two of the at least two input ports are placed orthogonally to each other and each of the two input ports placed orthogonally to each other is excited by a guide wavelength 1.3 $\lambda$g in a loop resonance mode,
    wherein each of the two input ports placed orthogonally to each other associates with at least one reflector, and
    wherein one of the at least one reflector associated with the respective input port is placed in a direction that is opposite to the respective input port.

2. The antenna system of claim 1, wherein, for the one of the at least one loop element having at least two input ports, one of the at least two input ports is coupled to the corresponding loop element through a microstrip line that is on the bottom side of the substrate.

3. A method of constructing an orthogonally polarized Yagi-like MIMO antenna system, the method comprising:
    forming at least one loop element on a top side of a substrate, wherein one of the at least one loop element has at least two input ports,
    placing, for the one of the at least one loop element having at least two input ports, one of the at least two input ports in a direction that is orthogonal to another one of the at least two input ports such that two of the at least two input ports are placed orthogonally to each other,
    forming, for each of the two input ports placed orthogonally to each other, at least one reflector,
    placing, for each of the two input ports placed orthogonally to each other, one of the at least one reflector associated with the respective input port in a direction that is opposite to the respective input port, and exciting the two input ports placed orthogonally to each other by a guide wavelength 1.3 $\lambda_g$ in a loop resonance mode.

4. The method of claim 3, further comprising:

coupling, for the one of the at least one loop element having at least two input ports, one of the at least two input ports to the corresponding loop element through a microstrip line that is on a bottom side of the substrate.

5. A triangular printed wideband Yagi based MIMO antenna system, comprising:

a substrate having a top side and a bottom side;

three loop elements on the top side of the substrate, wherein each of the three loop elements is placed at 120° with respect to other two loop elements; and at least one reflector, wherein one of the at least one reflector is placed on the bottom side of the substrate.

6. The antenna system of claim 5, wherein each of the three loop elements has two ends, wherein one end of the two ends is coupled to an input port and the other end of the two ends is coupled to the one of the at least one reflector that is placed on the bottom side of the substrate.

7. The antenna system of claim 6, wherein the input port of each loop element is excited by a guide wavelength 3.5$\lambda_g$ in a loop resonance mode.

8. The antenna system of claim 5, wherein each of the three loop elements has at least one parasitic director and one of the at least one parasitic director is placed on the top side of the substrate.

9. A method of constructing a triangular printed wideband Yagi based MIMO antenna system, the method comprising:

forming three loop elements on a top side of a substrate, wherein each of the three loop elements is placed at 120° with respect to other two loop elements; and forming at least one reflector, wherein one of the at least one reflector is placed on a bottom side of the substrate.

10. The method of claim 9, further comprising:

for each of the three loop elements having two ends, coupling one end of the two ends to an input port; and coupling the other end of the two ends to the one of the at least one reflector that is placed on the bottom side of the substrate.

11. The method of claim 10, further comprising:

exciting the input port of each loop element by a guide wavelength 3.5 $\lambda_g$ in a loop resonance mode.

12. The method of claim 9, further comprising:

forming at least one parasitic director for each of the three loop elements, wherein one of the at least one parasitic director is placed on the top side of the substrate.

* * * * *